(12) United States Patent  (10) Patent No.: US 6,868,798 B2
Robinson et al.  (45) Date of Patent: Mar. 22, 2005

(54) POWERED WATERCRAFT (75) Inventors: Charles W. Robinson, Santa Fe, NM (US); William F. Burns, III, San Diego, CA (US)

(73) Assignee: M Ship Co., LLC., San Diego, CA (US)

( * ) Notice: Subject to any disclaimer, the term of this patent is extended or adjusted under 35 U.S.C. 154(b) by 3 days.

(21) Appl. No.: 10/625,135

(22) Filed: Jul. 23, 2003

(65) Prior Publication Data

US 2005/0016435 A1  Jan. 27, 2005

(51) Int. Cl.[7] .............................................. B63B 1/32
(52) U.S. Cl. ..................................... 114/288; 114/291
(58) Field of Search ................................ 114/67 A, 271, 114/288, 289, 290, 291

(56) References Cited

U.S. PATENT DOCUMENTS

| | | | | |
|---|---|---|---|---|
| 3,091,206 A | * | 5/1963 | Cale | 114/291 |
| 3,316,874 A | * | 5/1967 | Canazzi | 114/67 A |
| 4,231,314 A | * | 11/1980 | Peters | 114/291 |
| 4,393,802 A | * | 7/1983 | Rizzo | 114/67 A |
| 4,587,918 A | * | 5/1986 | Burg | 114/67 A |
| 4,649,851 A | * | 3/1987 | April | 114/271 |
| 4,926,771 A | * | 5/1990 | Hull | 114/289 |
| 4,989,534 A | * | 2/1991 | Field | 114/289 |
| 5,685,253 A | * | 11/1997 | Alexander, Jr. | 114/291 |
| 6,250,245 B1 | | 6/2001 | Robinson et al. | |
| 6,314,903 B2 | | 11/2001 | Robinson et al. | |
| 6,526,903 B2 | | 3/2003 | Robinson et al. | |

* cited by examiner

*Primary Examiner*—Lars A. Olson
(74) *Attorney, Agent, or Firm*—Loyal McKinley Hanson (57) ABSTRACT

A watercraft includes at least one hull having at least one planing surface, at least one vertical step in the planing surface, and an onboard propulsion engine. An exhaust-venting system is provided for venting exhaust from the onboard propulsion engine at the vertical step in the planing surface while under way in order to introduce gas along the planing surface. The hull of one embodiment takes the form of an M-shaped boat hull. The invention also applies to any of various other watercraft hulls, including watercraft with multiple hulls such that each of the multiple hulls includes one or more planing surfaces with one or more vertical steps at which exhaust is vented.

7 Claims, 10 Drawing Sheets

POWERED WATERCRAFT

BACKGROUND OF THE INVENTION

1. Technical Field

This invention relates generally to powered watercraft, and more particularly to a high speed powered watercraft having one or more hulls with one or more planing surfaces.

2. Description of Related Art

Watercraft with one or more M-shaped boat hulls as described in U.S. Pat. Nos. 6,250,245 and 6,314,903 overcome certain bow wave concerns. They capture and channel the bow wave in order to suppress it. In sea trials of a boat embodying such a hull, the act of increasing power to test the advantages of the air planing cushion at higher boat speeds led to the discovery of unexpected high speed characteristics. Powered watercraft with one or more M-shaped boat hulls as described in U.S. Pat. No. 6,526,903 enhance some of the unexpected high speed characteristics of M-shaped boat hulls. They inject exhaust and/or surplus compressed air from main propulsion engines into the planing channels. Significant performance advantages and reduction of both thermal and acoustical (heat and sound) signatures result, along with military and commercial interest in further improvements. Thus, a need exists for additional high-speed improvements for such powered watercraft.

SUMMARY OF THE INVENTION

This invention addresses the need outlined above by venting propulsion engine exhaust at one or more vertical steps in one or more planing surfaces on the watercraft. Doing so introduces gas along the planing surface that significantly improves performance and efficiency. In that regard, the term "planing surface" herein includes planing channel ceilings on M-shaped boat hulls and also other hull surfaces on M-shaped boat hulls and other boat hulls (including displacement body surfaces) that plane at increased speed when the watercraft is under way. The term "vertical step" refers to a drag-reducing step in such a planing surface. So, the invention improves any of various powered watercraft hulls, including M-shaped boat hulls.

To paraphrase some of the more precise language appearing in the claims and further introduce the nomenclature used, a watercraft constructed according to the invention includes at least one hull (i.e., one or more) and an onboard propulsion engine (e.g., diesel, turbine, or other exhaust-producing propulsion engine onboard the watercraft). The hull includes at least one planing surface (i.e., one or more), and the planing surface includes at least one vertical step (i.e., one or more). The vertical step is an abrupt, drag-reducing variation in planing surface level that is a well known structure. Vertical steps properly designed and located across the planing surface of a hull serve to break the increasing friction drag on the planing surface in a known manner.

According to the major aspect of the invention, means are provided onboard the watercraft for venting exhaust and surplus compressed air from the onboard propulsion engine at the vertical step in the planing surface while under way in order to introduce gas along the planing surface (preferably high temperature gas). In one embodiment, the vertical step in the planing surface includes an upper portion and a lower portion, the hull defines an exhaust-venting opening intermediate the upper and lower portions of the vertical step, and the means for venting exhaust from the onboard propulsion engine at the vertical step includes an exhaust-venting system extending to the exhaust-venting opening. Single-hull and multiple-hull watercraft versions are described, along with multiple planing surfaces and multiple vertical steps. The means for venting exhaust is arranged to vent exhaust at one or more of the multiple vertical steps.

Preferably, the exhaust-venting opening at the vertical step is located intermediate the upper and lower portions of the vertical step where it faces rearwardly from the vertical step. That arrangement results in pressurized exhaust gases being directed parallel to and adjacent to the planing surface in order to create a film of high pressure gas that provides lift and further reduces friction drag. In addition, the entering gas creates a venturi effect that reduces the back pressure and its adverse effect on engine efficiency. Alternately, the exhaust-venting opening may be located in the upper portion of the vertical step and face downwardly from the upper portion, within the scope of the broader claims. In one embodiment, the planing surface includes multiple vertical steps and the planing surface retracts after each of the multiple vertical steps toward an original planing surface level. In another embodiment, the planing surface includes multiple vertical steps and the planing surface is elevated after each of the multiple vertical steps from an original planing surface level.

Thus, the invention in all of its variations significantly improves performance and efficiency of the M-shaped boat hull with a structural improvement that applies to other powered watercraft having other forms of hulls with planing surfaces. The following illustrative drawings and detailed description make the foregoing and other objects, features, and advantages of the invention more apparent.

DESCRIPTION OF THE PREFERRED EMBODIMENTS

Figure 1:
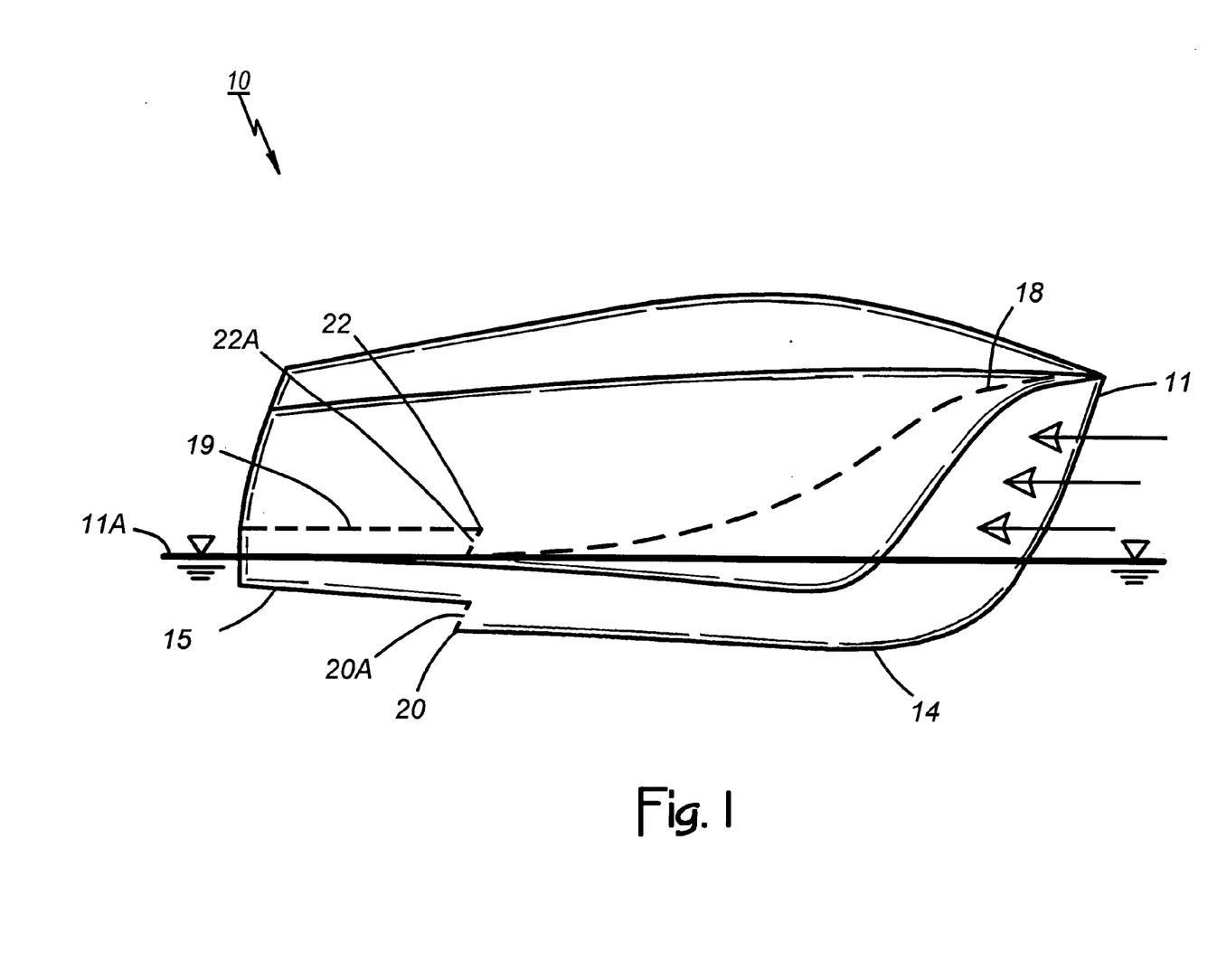
FIG. 1 of the drawings is a starboard side elevation view of a first watercraft constructed according to the invention that includes an M-shaped boat hull with vertical steps in the central displacement hull and the planing channels.
Figure 2:
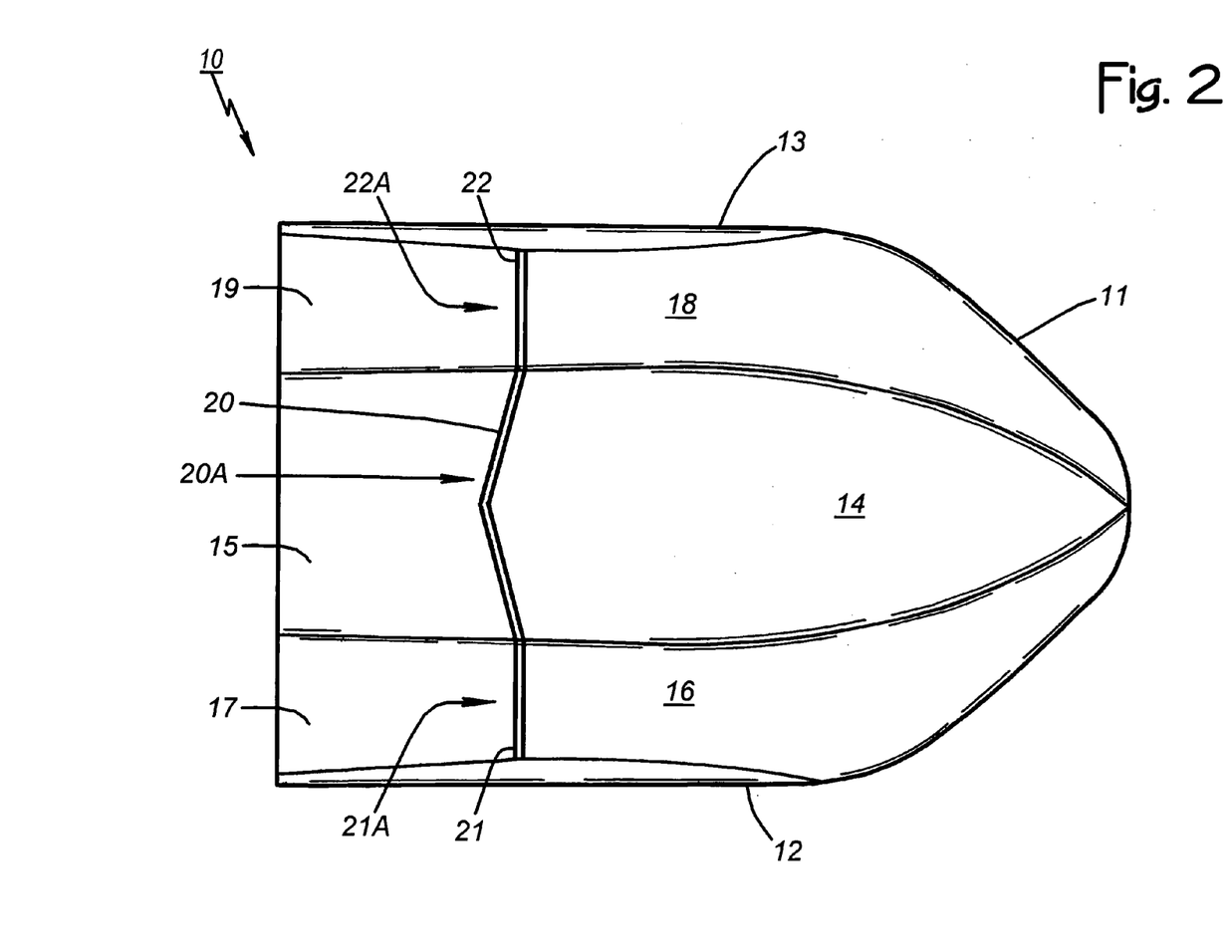
FIG. 2 is a diagrammatic plan view of the underside of the first watercraft showing the extension of the vertical steps that covers the entire central displacement body and the planing channels.
Figure 3:
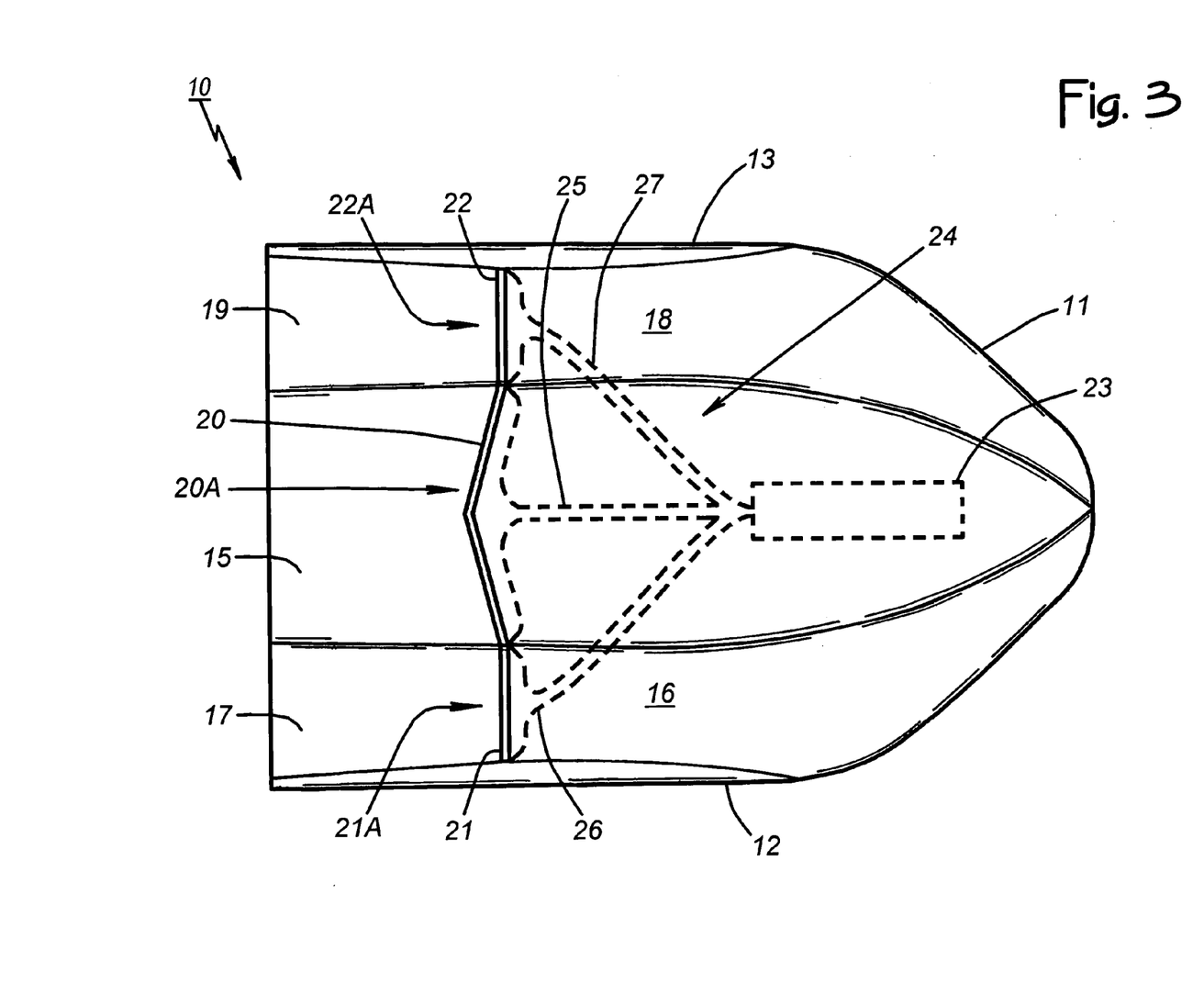
FIG. 3 is a diagrammatic view of the first watercraft similar to FIG. 2 that shows the exhaust-venting system for directing propulsion engine exhaust into the vertical steps.
Figure 4:
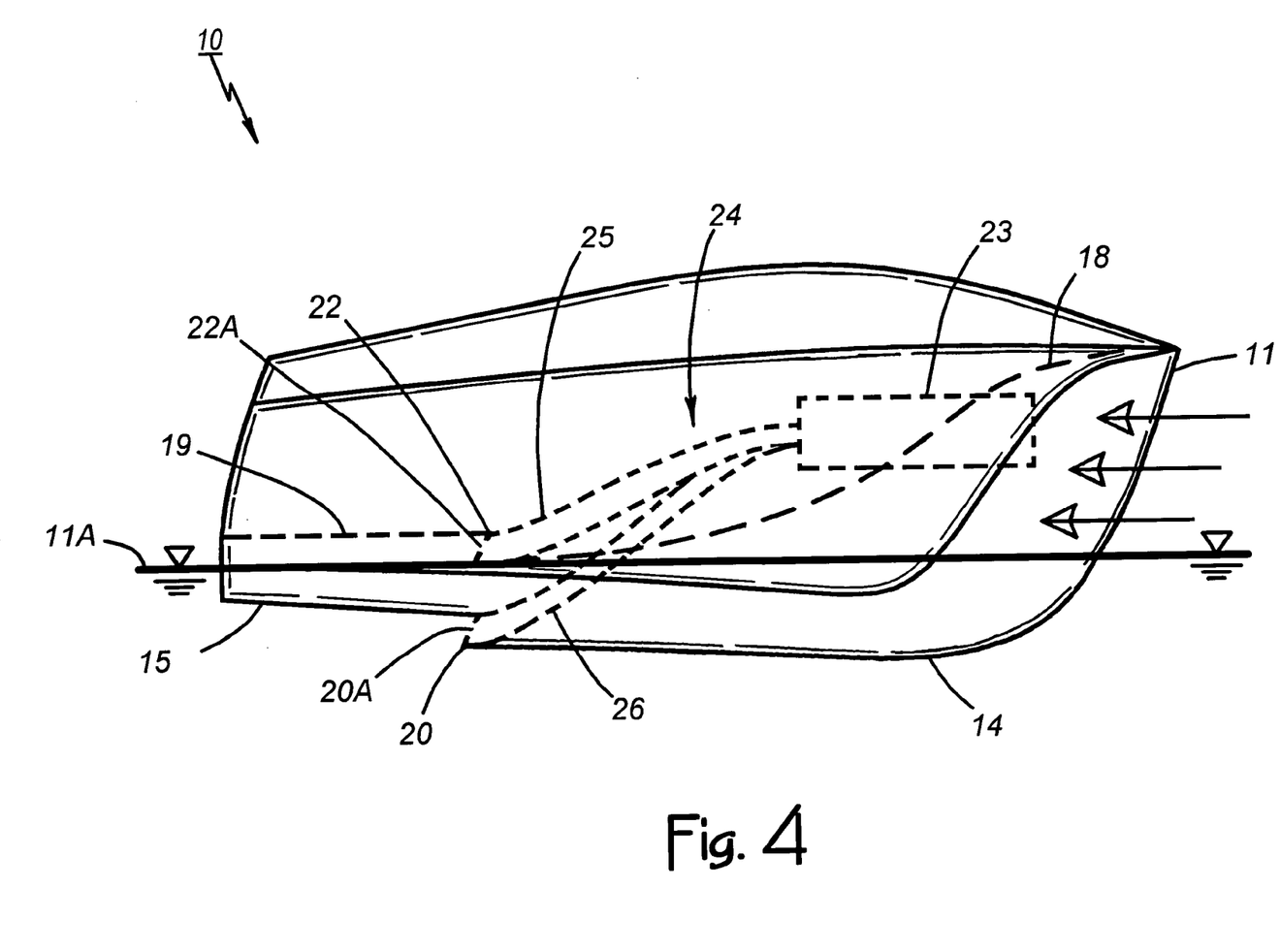
FIG. 4 is a starboard side elevation view of the first watercraft similar to FIG. 1 that includes the propulsion engine and the exhaust-venting system gas ducts leading into the vertical steps.

FIGS. 1-4 of the drawings show various aspects of a powered watercraft 10 constructed according to the invention. Although the invention applies to other than M-shaped boat hulls, the watercraft 10 includes an M-shaped boat hull 11 having a port side 12 (FIGS. 2 and 3) and a starboard side 13 (FIGS. 1-4). The hull 11 includes a central displacement body 14 having a planing surface 15 (FIGS. 1-4), a port channel ceiling 16 having a planing surface 17, and a starboard channel ceiling 18 having a planing surface 19. FIGS. 1 and 4 include the static water line 11A and three arrows depicting the flow of air when the watercraft 10 is under way. Additional details of the M-shaped boat hull aspects of the watercraft 10 may be had by reference to U.S. Pat. Nos. 6,250,245; 6,314,903; and 6,526,903.

In line with the major aspect of the invention, the watercraft 10 includes a first vertical step 20 (FIGS. 1-4) in the planing surface 15 of the central displacement body 14. The displacement body 14 portion of the hull 11 defines an exhaust-venting opening 20A at the first vertical step 20. The watercraft 10 also includes a second vertical step 21 in the planing surface 17 of the port channel ceiling 16 (FIGS. 2 and 3), and a third vertical step 22 in the planing surface 19 of the starboard channel ceiling 18 (FIGS. 1-4). The hull 11 defines a second exhaust-venting opening 21A at the second vertical step 21 (FIGS. 2 and 3) and a third exhaust-venting opening 22A at the third vertical step 22 (FIGS. 1-4). In that regard, the size of the vertical steps 20, 21, and 22 and the size of the exhaust-venting openings 20A, 21A, and 22A are not illustrated to scale. They are exaggerated for illustrated purposes in order to better identify them in the drawings.

An onboard propulsion engine 23 (FIGS. 3 and 4) powers the watercraft 10. It may take any of various known forms, including diesel, gas turbine, and jet engines, and it produces exhaust and surplus air that is conveyed by an exhaust-venting system 24 to the exhaust-venting openings 20A, 21A, and 22A. The exhaust-venting system 24 extends from the engine 23 to the exhaust-venting openings 20A, 21A, and 22A. It includes first, second, and third exhaust manifold branches 25, 26, and 27, each of which conveys exhaust from the engine 23 (e.g., via triangularly shaped ducts) to a respective one of the first, second, and third exhaust-venting openings 20A, 21A, and 22A. Stated another way, the exhaust-venting system 24 functions as means for venting exhaust from the onboard propulsion engine 23 at the vertical steps 20, 21, and 22 in the planing surfaces 15, 17, and 19 while under way in order to introduce gas along the planing surfaces. The high temperature of pressurized exhaust gas results in a film of high pressure gas along the planing surfaces 15, 17, and 19 that further reduces the friction drag for increased performance and efficiency.

Figure 5A:
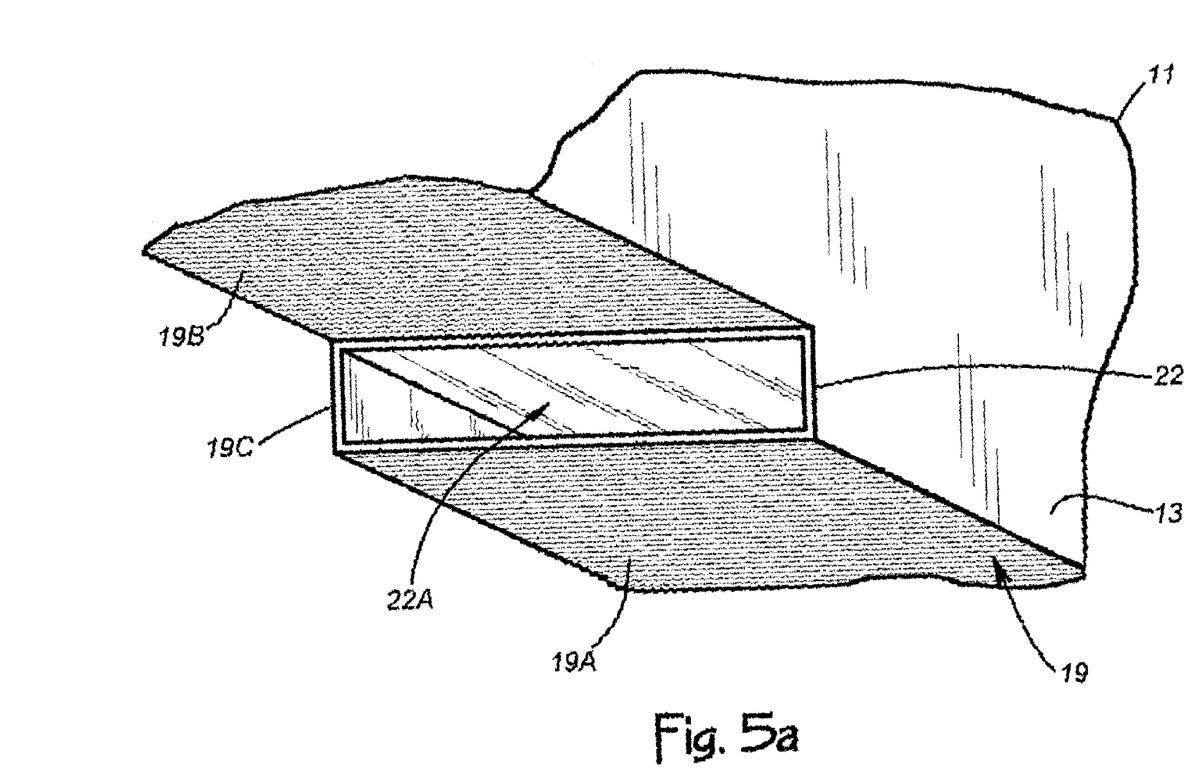
FIG. 5a is a diagram depicting an enlarged isometric view of a portion of the starboard side, the planing surface, and a vertical step of watercraft such that the exhaust-venting opening is located in the riser portion of the vertical step.

FIGS. 5a and 5b are diagrams that show further details of the exhaust-venting opening configuration. First consider FIG. 5a. It depicts an enlarged perspective view (not to scale) of the third vertical step 22 in the planing surface 19 adjacent the starboard side 13 of the hull 11. The vertical step 22 includes a forwardly disposed lower portion 19A at a first planing surface level of the planing surface 19 and a rearwardly disposed upper portion 19B at a second planing surface level of the planing surface 19 that is elevated relative to the first planing surface level by the height of a riser portion 19C of the third vertical step 22. The riser portion 19C defines the exhaust-venting opening 22A so that the exhaust-venting opening 22A faces rearwardly. In other words, the hull 11 defines an exhaust-venting opening 22A intermediate the upper and lower portions 19A and 19B that faces rearwardly from the vertical step 22. This is a preferred orientation.

Figure 5B:
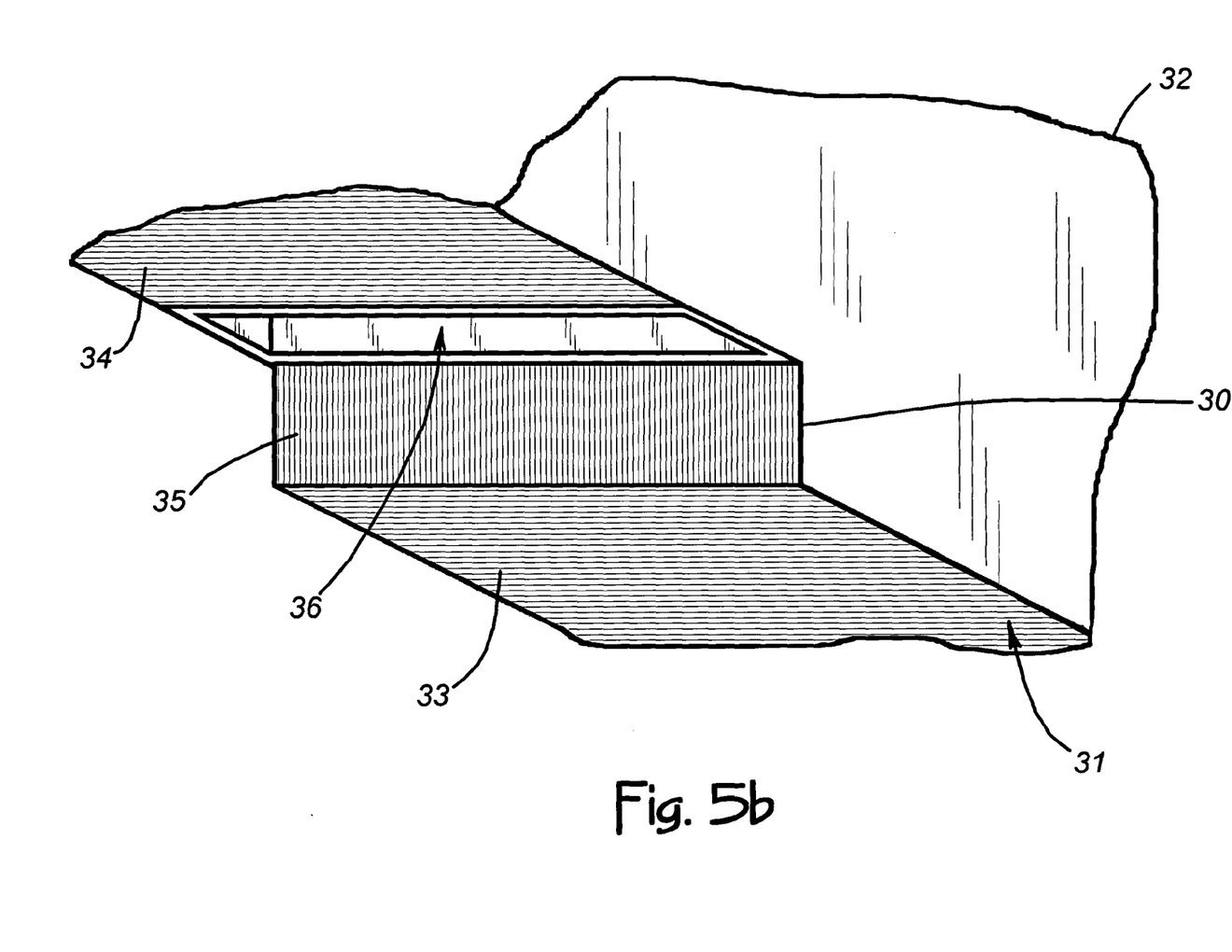
FIG. 5b is a diagram similar to FIG. 5a of an alternate exhaust-venting arrangement such that the exhaust-venting opening is located in the upper portion of the vertical step.

FIG. 5b illustrates that other opening orientations may be employed within the scope of the broader claims. It depicts an enlarged perspective view of a vertical step 30 in a planing surface 31 of a hull 32. The vertical step 30 is similar in some respects to the third vertical step 22 illustrated in FIG. 5a in that it includes a forwardly disposed lower portion 33 at a first planing surface level of the planing surface 31 and a rearwardly disposed upper portion 34 at a second planing surface level of the planing surface 31 that is elevated relative to the first planing surface level by the height of a riser portion 35 of the vertical step 30. The major difference is that the upper portion 34 defines an exhaust-venting opening 36 that faces downwardly, with exhaust being vented through it downwardly. In other words, the hull 32 defines an exhaust-venting opening 36 in the upper portion 34 that faces downwardly from the upper portion 36. Based upon the foregoing and subsequent descriptions, one of ordinary skill in the art can readily practice the invention.

Figure 6:
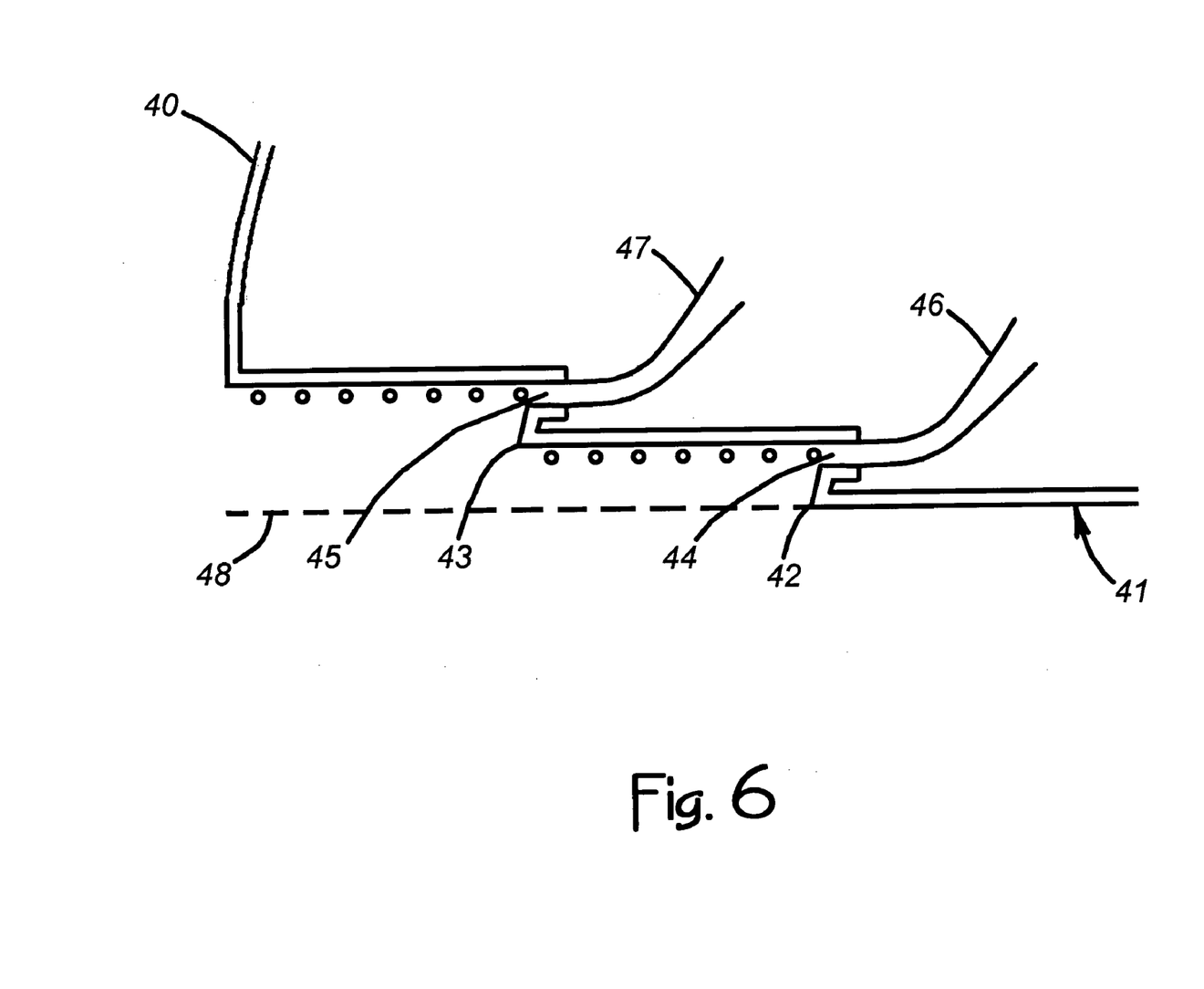
FIG. 6 is a diagrammatic starboard side elevation view of portions of a second watercraft constructed according to the invention that includes multiple vertical steps and an accompanying exhaust-venting system such that the planing level is raised at each step progressively.

Turning now to FIG. 6, shows a portion of a hull 40 that illustrates one type of vertical step configuration. The hull 40 represents the hull of any powered watercraft. It has a planing surface 41, a forwardly disposed first vertical step 42 and a rearwardly disposed second vertical step 43. The hull 40 defines first and second exhaust-venting openings 44 and 45 through which exhaust manifold branches 46 and 47 vent exhaust. The small circles in FIG. 6 represent exhaust and surplus air venting through the exhaust-venting openings 44 and 45. In this vertical step configuration, the planing level is raised at each of the first and second vertical steps 42 and 43 progressively from an original planing level identified by the broken line at reference numeral 48.

Figure 7:
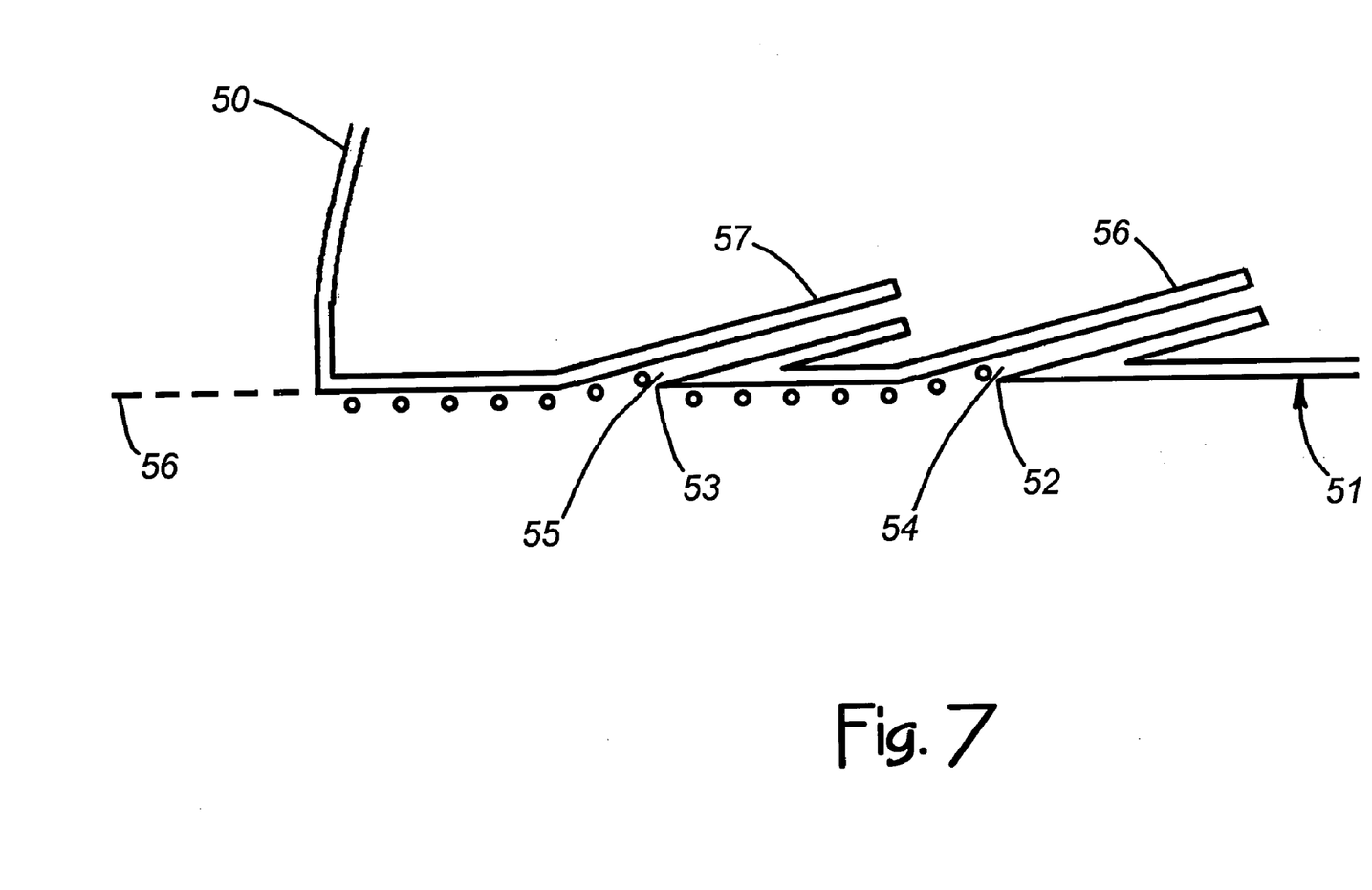
FIG. 7 is a diagrammatic starboard side elevation view of portions of a third watercraft constructed according to the invention that includes multiple vertical steps and an accompanying exhaust-venting system such that the planing level retracts after each step to the original planing surface.

FIG. 7 shows a portion of a hull 50 that illustrates another type of vertical step configuration. The hull 50 has a planing surface 51, a forwardly disposed first vertical step 52 and a rearwardly disposed second vertical step 53. The hull 50 defines first and second exhaust-venting openings 54 and 55 through which exhaust manifold branches 56 and 57 vent exhaust. The small circles represent exhaust and surplus air venting through the exhaust-venting openings 54 and 55. In this vertical step configuration, the planing level 51 raises at each of the first and second vertical steps 52 and 53 from an original planing level identified by the broken line at reference numeral 58, only to quickly return to the original planing level.

Figure 8:
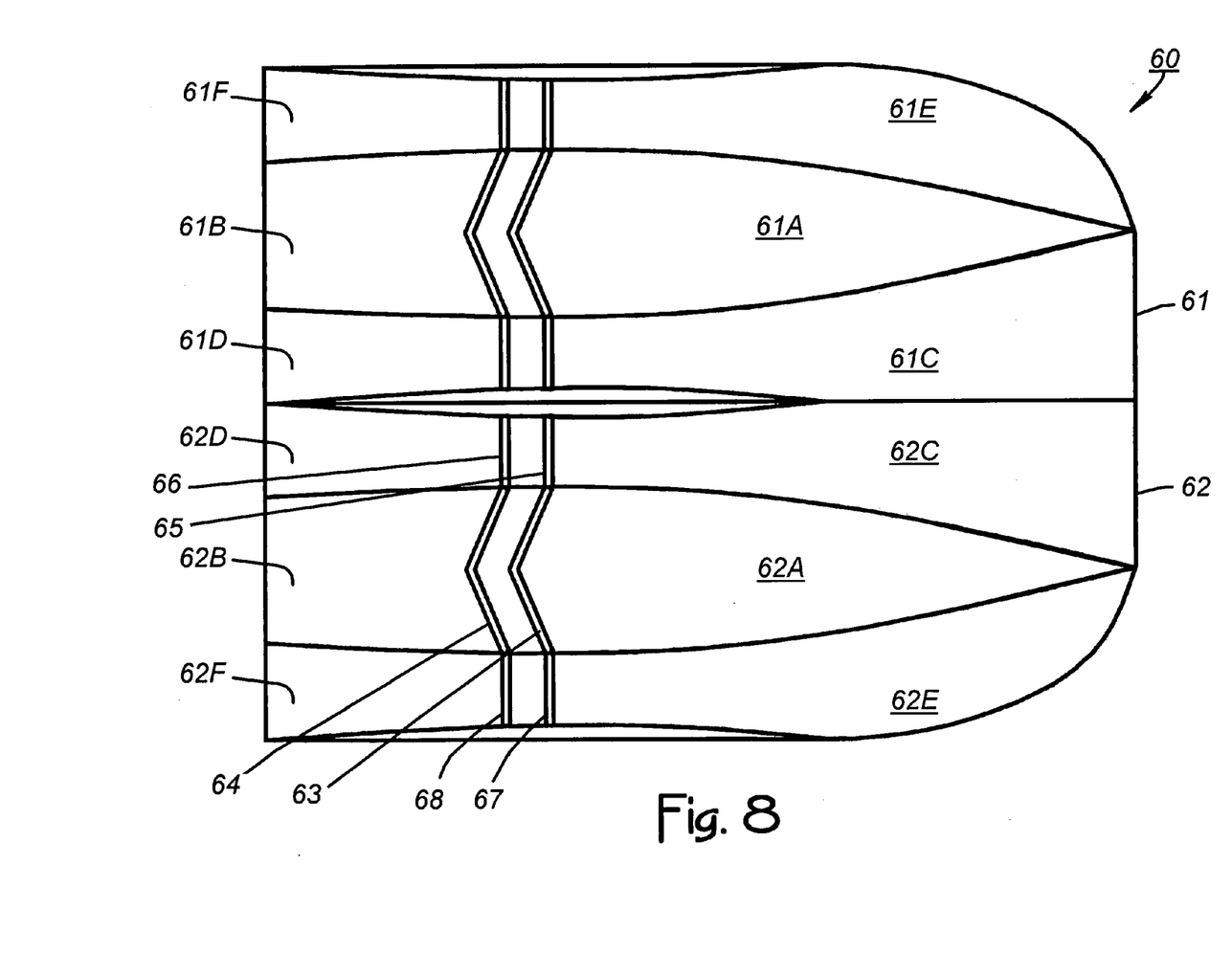
FIG. 8 is a diagrammatic plan view similar to FIG. 2 of the underside of a fourth watercraft having multiple hulls and multiple vertical steps in each hull.

FIG. 8 is a diagram depicting the underside of a multiple hull watercraft 60 constructed according to the invention. It includes a first hull 61 and a second hull 62. The first hull 61 includes a central displacement body 61A with a planing surface 61B, an inwardly disposed first channel ceiling 61C with a planing surface 61D, and an outwardly disposed second channel ceiling 61E with a planing surface 61F. Similarly, the second hull 62 includes a central displacement body 62A with a planing surface 62B, an inwardly disposed first channel ceiling 62C with a planing surface 62D, and an outwardly disposed second channel ceiling 61E with a planing surface 61F. Each planing surface includes two vertical steps arranged in line to span the width of the planing multiple surfaces. Just the six vertical steps 63, 64, 65, 66, 67, 68 are identified for the three planing surfaces 62B, 62D, and 62F of the second hull 62 for illustrative convenience.

Figure 9:
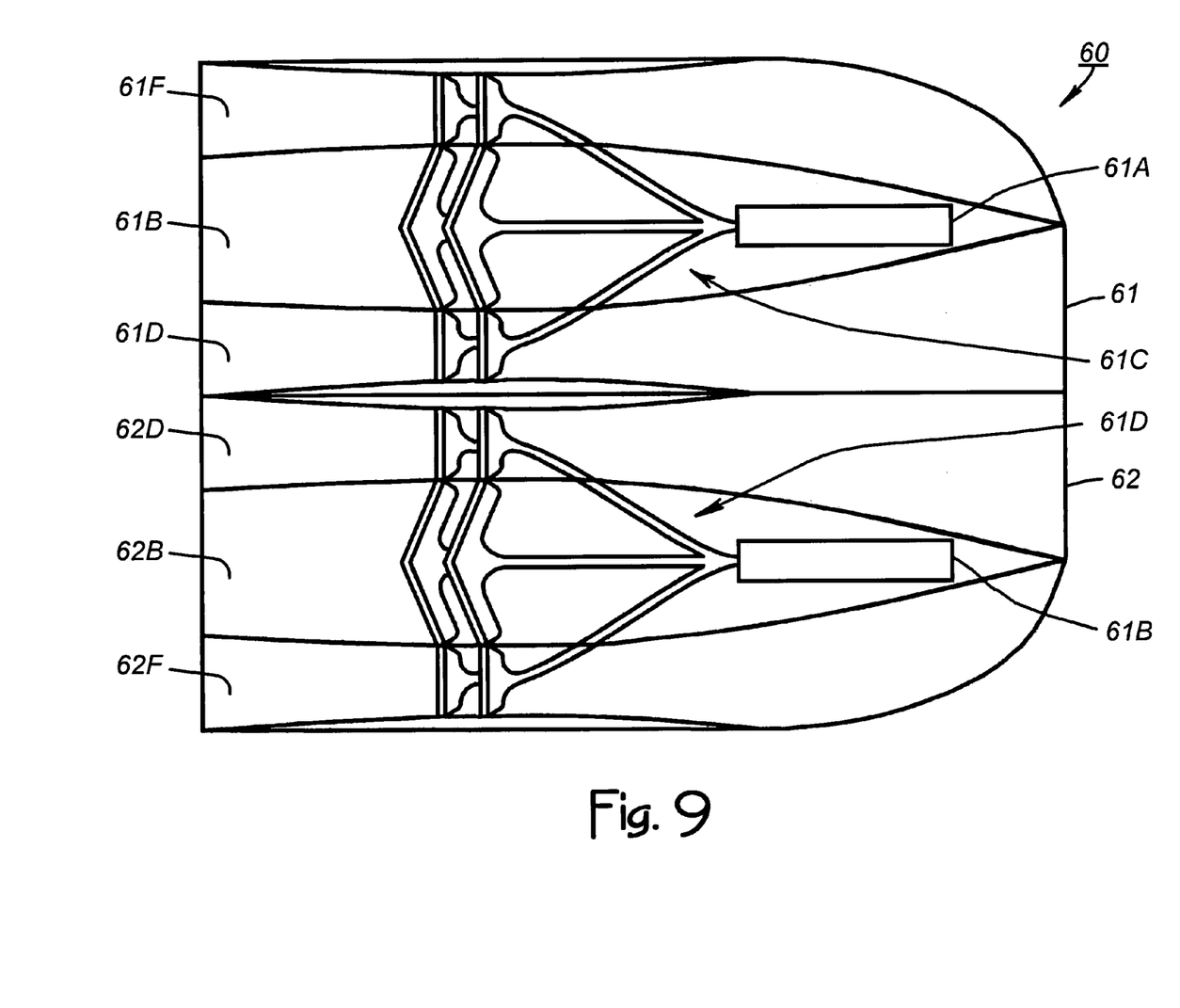
FIG. 9 is a diagrammatic plan view of the fourth watercraft that includes the exhaust-venting system for directing propulsion engine exhaust into the vertical steps.

FIG. 9 shows the watercraft 60 with first and second propulsion engines 60A and 60B connected to the vertical steps via first and second exhaust-venting systems 60C and 60D. In other words, the invention applies to powered watercraft with multiple hulls and with multiple vertical steps in each planing surface. It is not restricted to single hull M-shaped boat hulls. In that regard, the term "M-shaped boat hull" herein refers to a boat hull that falls within the scope of one or more of the claims in U.S. Pat. Nos. 6,250,245; 6,314,903; and 6,526,903, and those patents are incorporated herein by reference for all of the details they provide.

Thus, the invention provides a powered watercraft that vents propulsion engine exhaust at one or more vertical steps in one or more planing surfaces on the watercraft. Doing so introduces gas along the planing surface (preferably high temperature gas) that significantly improves performance and efficiency. Although exemplary embodiments have been shown and described, one of ordinary skill in the art may make many changes, modifications, and substitutions without necessarily departing from the spirit and scope of the invention.

What is claimed is:

1. A watercraft, comprising:
   a hull having a fore end, an aft end, and a longitudinal axis extending between the fore end and the aft end;
   a displacement body portion of the hull that extends between the fore end and the aft end, the displacement body having a static waterline, a port side, and a starboard side;
   a first channel-defining structure portion of the hull that is located on the port side of the displacement body, including a first wing structure extending laterally from the port side of the displacement body above the static waterline and a first outer skirt structure that extends downwardly from the first wing structure to below the static waterline in spaced apart relationship to the displacement body, said first outer skirt structure having an outer surface that is substantially perpendicular with respect to the static waterline and said first channel-defining structure defining a first channel with a cross-sectional surface that is generally arcuate; and
   a second channel-defining structure portion of the hull that is located on the starboard side of the displacement body, including a second wing structure extending laterally from the starboard side of the displacement body above the static waterline and a second outer skirt structure extending perpendicularly downwardly from the second wing structure to below the static waterline in spaced apart relationship to the displacement body, said second outer skirt structure having an outer surface that is substantially perpendicular with respect to the static waterline and said second channel-defining structure defining a second channel with a cross-sectional surface that is generally arcuate;
   the first and second channels extending from the fore end to the aft end and the first and second channels being adapted to capture a bow wave and to cause air and water to mix and spiral toward the aft end of the hull as compressed aerated water, thereby reducing friction drag, increasing lateral stability, and dampening transmission of bow wave energy at the aft end of the hull; and
   the hull including at least one planing surface, at least one vertical step in the planing surface, an onboard propulsion engine, and means for venting exhaust from the onboard propulsion engine at the vertical step in the planing surface while under way in order to introduce gas along the planing surface.

2. A watercraft as recited in claim 1, wherein:
   the vertical step in the planing surface includes an upper portion and a lower portion;
   the hull defines an exhaust-venting opening intermediate the upper and lower portions of the vertical step; and
   the means for venting exhaust from the onboard propulsion engine at the vertical step includes an exhaust-venting system extending to the exhaust-venting opening.

3. A watercraft as recited in claim 1, wherein the watercraft includes multiple hulls with multiple planing surfaces and multiple vertical steps, and the means for venting exhaust is arranged to vent exhaust at each of the multiple vertical steps.

4. A watercraft as recited in claim 1, wherein the planing surface includes multiple vertical steps and the planing surface retracts after each of the multiple vertical steps toward an original planing surface level.

5. A watercraft as recited in claim 1, wherein the planing surface includes multiple vertical steps and the planing surface is elevated after each of the multiple vertical steps from an original planing surface level.

6. A watercraft as recited in claim 1, wherein the vertical step in the planing surface includes an upper portion and a lower portion, and the hull defines an exhaust-venting opening intermediate the upper and lower portions of the vertical step that faces rearwardly from the vertical step.

7. A watercraft as recited in claim 1, wherein the vertical step in the planing surface includes an upper portion and a lower portion, and the hull defines an exhaust-venting opening in the upper portion of the vertical step that faces downwardly from the upper portion.

* * * * *